United States Patent [19]

Blake et al.

[11] Patent Number: 4,478,237

[45] Date of Patent: Oct. 23, 1984

[54] PRESSURE MODULATING AND REDUCING VALVE

[75] Inventors: William W. Blake, Kewanee; Alan R. Coutant, Chillicothe, both of Ill.

[73] Assignee: Caterpillar Tractor Co., Peoria, Ill.

[21] Appl. No.: 512,259

[22] Filed: Jul. 11, 1983

Related U.S. Application Data

[63] Continuation-in-part of Ser. No. 410,739, Aug. 23, 1982, abandoned.

[51] Int. Cl.³ .............................................. G05D 16/10
[52] U.S. Cl. ................................ 137/116.3; 192/85 R
[58] Field of Search ............................ 137/116, 116.3; 192/85 R, 87.13, 87.18, 87.19

[56] References Cited

U.S. PATENT DOCUMENTS

| | | | |
|---|---|---|---|
| 3,583,422 | 6/1971 | Dach | 137/116.3 |
| 3,918,488 | 11/1975 | Minami | 192/87.18 X |
| 3,949,847 | 4/1976 | Hoehn | 192/3.3 |
| 3,960,172 | 6/1976 | Blake | 137/504 |
| 4,281,676 | 8/1981 | Morris | 137/102 |

Primary Examiner—Robert G. Nilson
Attorney, Agent, or Firm—John W. Grant

[57] ABSTRACT

A pressure modulating and reducing valve (10) communicates pressurized hydraulic fluid from a pump (11) to a hydraulically actuated clutch of a transmission at a modulated rate of pressure rise and at a reduced pressure. In order to provide a compact valve, the valve (10) has a pressure reducing valve spool (61) slidably nested within a sleeve member (46) of a load piston to provide a valving action therebetween for controlling fluid flow between an inlet port (24), a load port (26) and a drain port (27) in a body (19). Movement of the sleeve member (46) causes an increase in the pressure at the load port (26) which causes the pressure reducing valve spool (61) to move against a spring (77,78) to establish a pressure in the load port (26) proportional to the travel distance of the sleeve member (46). Movement of the sleeve member (46) is controlled by a solenoid control valve (85) having a spool (86) slidably nested within a projection (54) of an end wall (51) extending into a bore (62) of the pressure reducing valve spool (61).

17 Claims, 3 Drawing Figures

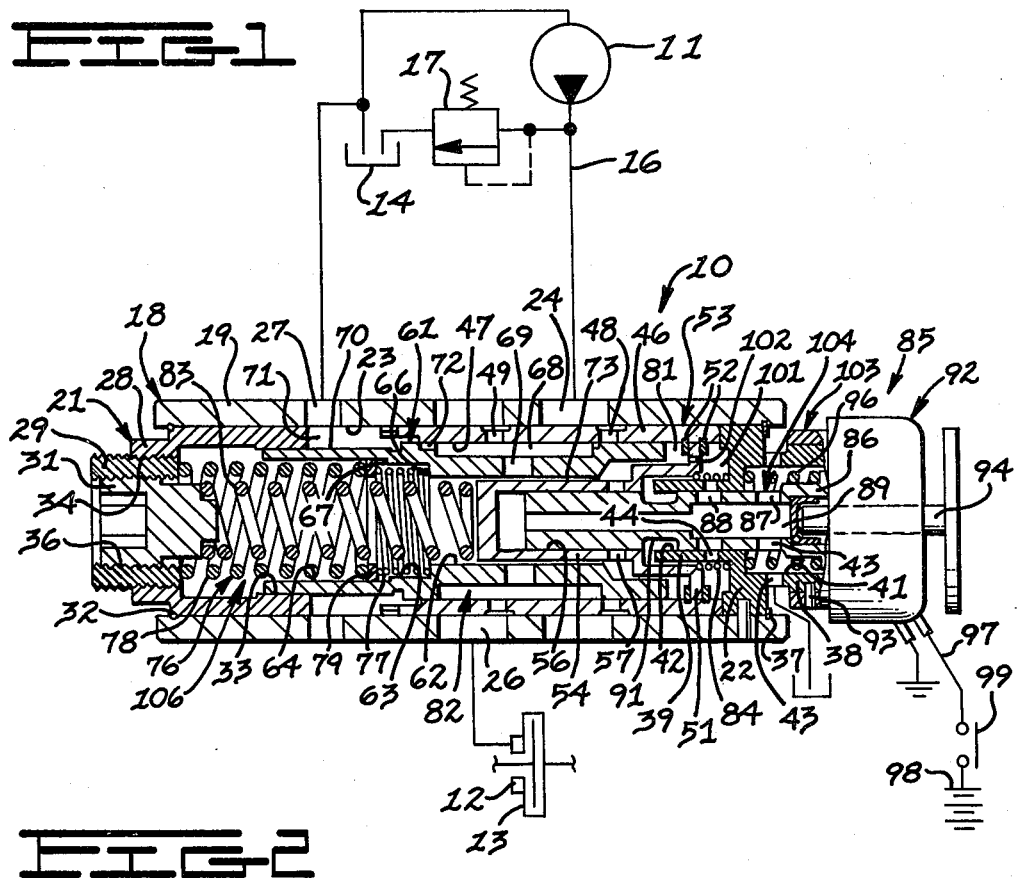
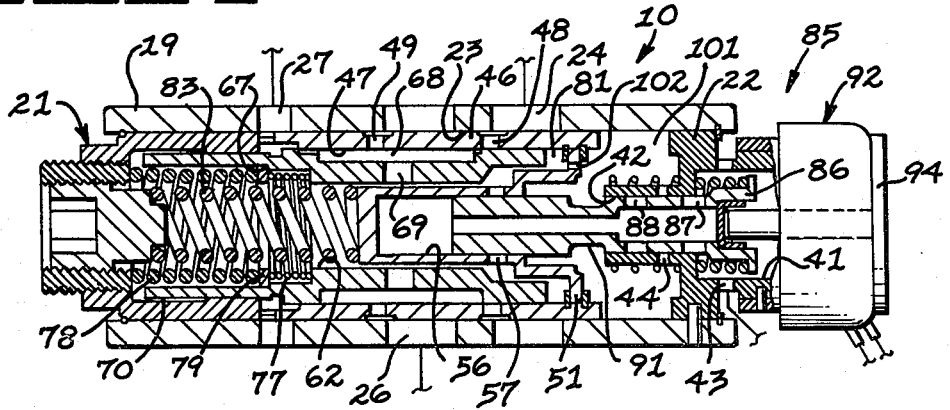

PRESSURE MODULATING AND REDUCING VALVE

CROSS REFERENCES TO RELATED APPLICATIONS

This is a continuation-in-part of application Ser. No. 410,739 filed Aug. 23, 1982, now abandoned.

DESCRIPTION

1. Technical Field

This invention relates generally to a pressure modulating and reducing valve and more particularly to a compact pressure modulating and reducing valve of the type particularly adapted for use in individually controlling the hydraulic actuating clutches of a transmission.

2. Background Art

The hydraulic actuating clutches of a transmission usually require controlled modulation of the hydraulic actuating fluid to provide for the gradual engagement thereof. Such clutches also require the maintenance of a predetermined pressure level in the actuating fluid which is commonly less than the system pressure. Many power shift transmissions have several hydraulic actuating clutches each of which frequently should have different rates of pressure rise during engagement and/or different predetermined pressure levels in the actuating fluid at full engagement. Thus, ideally a separate control should be provided for individual modulated control of the actuating fluid to each clutch. Because of space limitations, one of the problems encountered in designing such concepts, however, is that of incorporating all the necessary valving functions in a single compact arrangement.

One design of a pressure modulating valve which solves the above problem to some extent is found in U.S. Pat. No. 4,281,676 which issued to Hugh C. Morris on Aug. 4, 1981. However, the modulating and valving functions of that patent are arranged in end to end relationship such that the overall length thereof would be objectionable in some smaller transmission arrangements.

The present invention is directed to overcoming the problem as set forth above.

DISCLOSURE OF THE INVENTION

In one aspect of the present invention there is provided a pressure modulating and reducing valve for communicating pressurized fluid from a source to a load chamber at a modulated rate of pressure rise and at a reduced pressure, comprising a housing including a body having a bore therein and an inlet port, a load port and a drain port axially spaced from one another and being in communication with the bore, and a retainer connected to the body at one end of the bore; a sleeve member slidably positioned in said bore of said body and having a bore therein and first and second passages communicating the bore of the sleeve member with the inlet port and load port respectively; an end wall connected to the sleeve member at one end of the bore of the sleeve member; a pressure reducing valve spool slidably positioned in the bore of the sleeve member for relative movement therebetween; resilient means for resisting movement of the pressure reducing valve spool toward the retainer; a reaction chamber between the valve spool and the end wall; means for communicating the load port with the reaction chamber; and means for selectively moving the sleeve member relative to the pressure reducing valve spool at a modulated rate so that the fluid pressure in the reaction chamber and the load port increases and reacts against the pressure reducing valve spool moving it against the resilient means to establish a pressure proportional to the movement of the sleeve member.

The problem of providing a compact pressure modulating and reducing valve is solved by the present invention by nesting the pressure reducing valve spool within an outer sleeve member for relative movement therebetween such that the modulated rate of pressure rise in the fluid directed to the clutch is controlled by controlling the rate of movement of the sleeve member. By nesting the pressure reducing valve spool within the sleeve member, the overall length of the valve arrangement can be shorter than arrangements having the modulating and valving function in an end to end relationship.

BRIEF DESCRIPTION OF THE DRAWINGS

FIG. 1 is a longitudinal sectional view of an embodiment of the present invention incorporated into a hydraulic control circuit for actuating a clutch.

FIG. 2 is a view similar to FIG. 1 but showing a second operating condition of a valve.

BEST MODE FOR CARRYING OUT THE INVENTION

Figure 3:
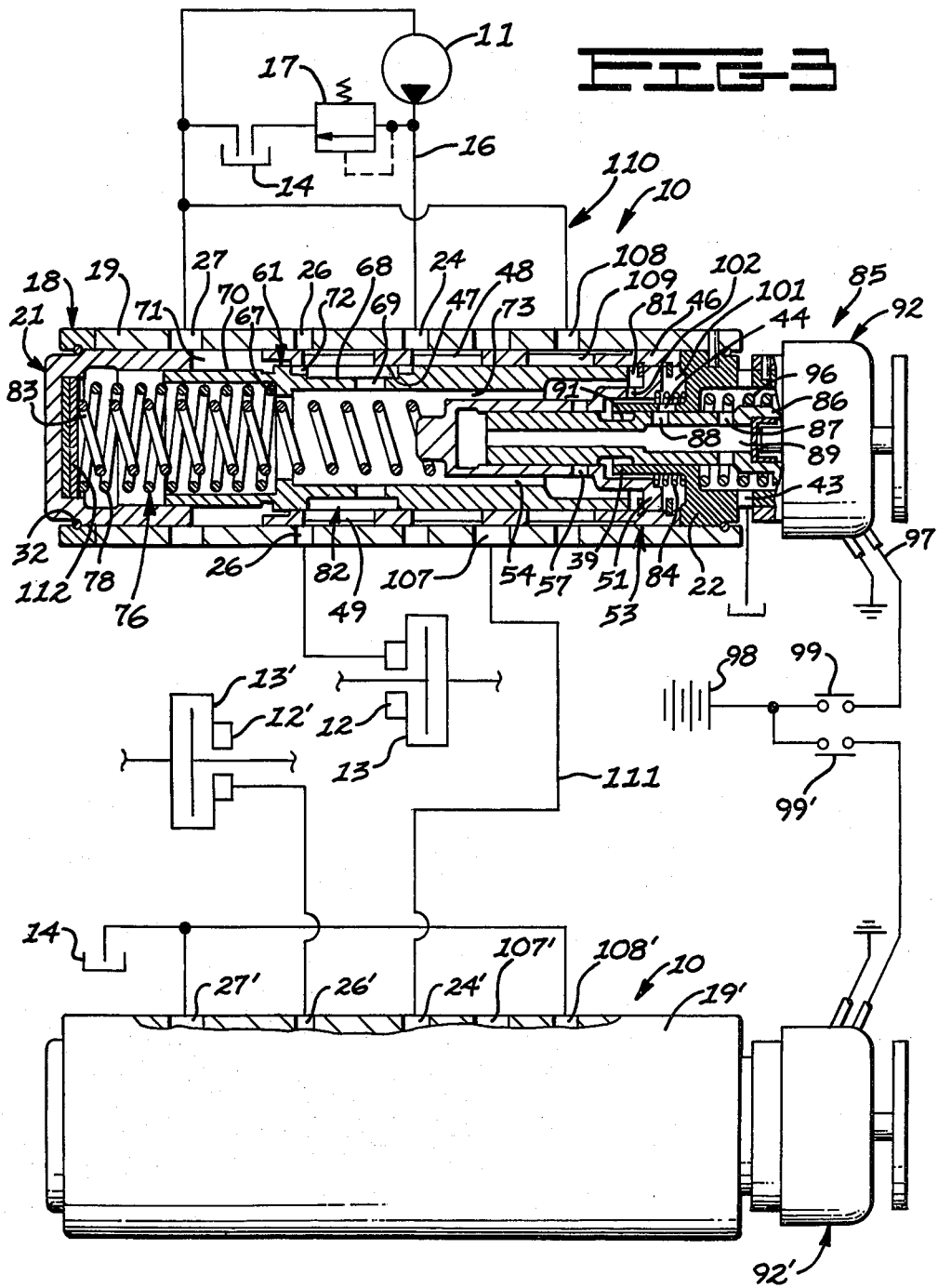
FIG. 3 is a longitudinal sectional view of another embodiment of the present invention incorporated into a hydraulic control circuit.

Referring now to FIGS. 1 and 2, a pressure modulating and reducing valve is generally indicated by the reference numeral 10 for communicating pressurized hydraulic fluid from a source, such as a pump 11, to a load chamber 12 of a hydraulically actuated clutch 13 at a modulated rate of pressure rise and at a reduced pressure. The pump 11 draws fluid from a reservoir 14 and directs fluid to the pressure modulating and reducing valve 10 through a conduit 16. A standard relief valve 17 is connected to the conduit 16.

The pressure modulating and reducing valve 10 has a housing 18 which includes a body 19, a retainer 21 and an annular end member 22. The body 19 has a bore 23 extending axially therethrough and a pair of inlet ports 24, a pair of load ports 26 and a pair of drain ports 27 axially spaced from one another and in communication with bore 23. It should be noted that while the drawing schematically shows only one of the inlet ports 24 being connected to the conduit 16, one of the load ports 26 being connected to the load chamber 12 of the clutch 13 and one of the drain ports 27 being connected to the reservoir 14, the modulating and reducing valve 10 is designed to be inserted into a bore of a transmission case having annuli therein matching with the inlet ports 24, load ports 26 and drain ports 27 such that both inlet ports 24 connect to the conduit 16, both load ports 26 connect to the load chamber 12 and both drain ports 27 connect to the reservoir 14. Moreover both ends of the valve 10 will open into cavities which are connected to the reservoir 14.

The retainer 21 is connected to the body 19 at one end of the bore 23 and includes a first cylindrical element 28, a second cylindrical element 29 and a threaded plug 31. The first cylindrical element 28 extends into the bore 23 of the body 19 and is retained therein by a snap ring 32.

A bore 33 and a threaded bore 34 are provided in the first cylindrical element coaxial with the bore 23 of the body 19. The second cylindrical element 28 is threaded into the threaded bore 34 of the first cylindrical element and has a threaded bore 36 extending therethrough. The threaded plug 31 is threaded into the threaded bore 36 of the second cylindrical element 29.

The annular end member 22 is positioned within the other end of the bore 23 and is retained therein by a snap ring 37. The annular member 22 has a projection 38 extending axially outwardly and another projection 39 extending axially inwardly. A pair of bores 41,42 are provided in the projections 38,39 respectively and are coaxial with the bore 23 in the body 19. A passage 43 in the projection 38 connects the bore 41 with the reservoir 14. A pair of passages 44 in the projection 39 communicate the bore 42 with the outer periphery of the projection 39.

A sleeve member 46 is slidably positioned within the bore 23 of the body 19 and has a bore 47 concentric with the bore 23. First and second pairs of passages 48,49 communicate the bore 47 with the inlet ports 24 and load ports 26 respectively. An end wall 51 is positioned within one end of the bore 47 of the sleeve member 46 and is connected to the sleeve member 46 by a pair of snap rings 52. The sleeve member 46 and end wall 51 together form a load piston 53. The end wall 51 has an inwardly extending projection 54 with the projection having a blind bore 56 therein coaxial with the bore 23 of the body 19. A pair of passages 57 communicate the bore 56 with the outer periphery of the projection 54.

A pressure reducing valve spool 61 is slidably positioned in the bore 47 of the sleeve member 46 for relative movement therebetween. The pressure reducing valve spool 61 has a bore 62 extending therethrough and first and second counterbores 63,64 formed in the end portion thereof adjacent the retainer 21. The first counterbore 63 terminates at a shoulder 66 while the second counterbore 64 terminates at a shoulder 67. An annulus 68 is formed in the outer periphery of the pressure reducing valve spool 61 and is connected to the bore 62 through a pair of passages 69. A reduced diameter portion 70 of the pressure reducing valve spool slidably extends into the bore 33 of the first cylindrical element 28 and forms an annular chamber 71 in communication with the drain port 27. A metering slot 72 selectively communicates the annulus 68 with the annular chamber 71. An annular space 73 is provided between the projection 54 and the bore 62 of the pressure reducing valve spool 61.

A resilient means 76 is provided for resisting leftward movement of the pressure reducing valve spool 61 toward the retainer 21. The resilient means 76 includes first and second springs 77,78 and a spacer 79. The first spring 77 is a relatively low rate spring and is positioned between the shoulder 66 and the spacer 79. The spacer 79 is slidably positioned in the counterbore 64. The second spring 78 has a higher spring rate than the first spring 77 and is positioned between the spacer 79 and the second cylindrical element 29. Alternatively the resilient means 76 can comprise a single spring positioned between the retainer 21 and one of the shoulders 66 or 67.

A reaction chamber 81 is formed by portions of the pressure reducing valve spool 61, the retainer 21, the sleeve member 46, and the end wall 51. Although fluid in the reaction chamber 81 reacts against both ends of the pressure reducing valve spool, the reduced diameter portion 70 thereof provides a differential area at opposite ends of the pressure reducing valve spool such that pressurized fluid in the reaction chamber 81 results in a net force acting on the pressure reducing valve spool in a direction urging it leftward against the first and second springs 77,78. Thus the reaction chamber 81 is considered herein to be positioned between the end wall 51 and the pressure reducing valve spool 61.

The second passage 49 in the sleeve member 46 and the annulus 68 and passages 69 in the pressure reducing valve spool provide a means 82 for communicating the load ports 26 with the reaction chamber 81 for urging the pressure reducing valve spool 61 against the resilient means 76.

A spring 83 is positioned between the threaded plug 31 of the retainer 21 and the projection 54 of the end wall 51. The free length of the spring 83 is slightly less than the distance between the threaded plug and the end of the projection 54. A dampening spring 84 is positioned between the end wall 51 and the annular member 12.

A control valve 85 has a valve spool 86 slidably positioned in the bore 42 of the annular member 22 and the bore 56 in the projection 54 of the end wall 51. The valve spool 86 has first and second pairs of radial passages 87,88 in communication with an axial passage 89. An annular groove 91 is formed in the valve spool 86 intermediate its ends.

A solenoid 92 of the control valve 85 is connected to the projection 38 of the annular member 22 by a pin 93 and has a plunger 94 in engagement with the valve spool 86. A spring 96 resiliently urges the valve spool 86 toward the solenoid 92. The solenoid 92 is connected to an electrical circuit 97 which includes a battery 98 and a selectively actuatable switch 99.

Portions of the body 19, sleeve member 46, end wall 51, annular member 22, and valve spool 86 cooperate to form an actuating chamber 101 which is in continuous communication with the reaction chamber 81 through an orifice 102 in the end wall 51.

A means 103 for selectively moving the sleeve member 46 relative to the body 19 and the pressure reducing valve spool 61 at a modulated rate to controllably establish a plurality of operating conditions of the pressure modulating and reducing valve 10 includes the actuating chamber 101 and a means 104 for selectively pressurizing the actuating chamber. The means 108 for selectively pressurizing the actuating chamber includes the orifice 102, passages 44 in the projection 39 of the annular member 22, and the valve spool 86. A means 106 for biasing the sleeve member 46 to an initial position against the annular member 22 includes a force generated by the pressurized fluid in the reaction chamber 81.

An alternate embodiment of a pressure modulating and reducing valve of the present invention is disclosed in FIG. 3. It is noted that the same reference numerals of the first embodiment are used to designate similarly constructed counterpart elements of this embodiment. In this embodiment, however, the body 19 has a pair of outlet ports 107 and a second pair of drain ports 108 axially spaced from one another and from the inlet ports 24 and in communication with the bore 23. Additionally, the sleeve member 46 has a third pair of passages 109 in continuous communication with the drain ports 108 of the body 19 and in communication with the bore 47 in the sleeve member 46. Similarly to the first embodiment, the modulating and reducing valve 10 is designed to be inserted into a bore of a transmission case having annuli therein matching with the inlet ports 24, the load ports 26, the drain ports 27, the outlet ports 107 and the drain ports 108 so that a particular pair of ports are in communication with one another.

The pressure modulating and reducing valve 10 of this embodiment is adapted for use as a first pressure modulating and reducing valve 10 in a hydraulic control circuit 110 having another pressure modulating and reducing valve 10' downstream thereof in a cascade or series flow relationship. A conduit 111 connects the outlet ports 107 of the body 19 of the first pressure modulating and reducing valve 10 to the inlet ports 24' of the body 19' of the second pressure modulating and reducing valve 10'. The drain ports 27' and 108' are in continuous communication with the reservoir 14. The load ports 26' are connected to the load chamber 12' of the clutch 13'. The solenoid 92' is selectively connectable by the switch 99' to the battery 98 of the electrical circuit 97.

In the arrangement shown in FIG. 3, the outlet ports 107' of the second pressure modulating and reducing valve 10' will be blocked, for example, by the bore in the transmission case in which the body 19 is inserted. However, should the hydraulic circuit include more than two pressure modulating and reducing valves, the outlet ports of the upstream valves will be connected to the inlet ports of the downstream valves with the outlet ports of the last valve in the series being blocked.

Also in this embodiment, the resilient means 76 includes only a single spring 78 and the multipiece retainer 21 has been replaced with a one piece retainer 21. The preload on the spring 78 is adjusted through adding or replacing shims, two of which are shown at 112.

Industrial Applicability

FIG. 1 depicts a first operating condition of the pressure modulating and reducing valve 10 of the first embodiment wherein the pump 11 is driven by the prime mover (not shown) to direct hydraulic fluid through the conduit 16 to the inlet ports 24. In the first condition, the solenoid 92 is in a deactivated condition by virtue of the switch 99 being open so that the valve spool 86 is urged to a first position against the solenoid 92 by the spring 96. At the first position of the valve spool 86, the actuating chamber 101 is connected to the reservoir 14 through the passages 44, 88, 89, 87 and 43 so that there is no build up of pressure in the actuating chamber 101.

The orifice 102 restricts fluid flow from the reaction chamber 81 thereby causing a slight pressure increase in the fluid in the reaction chamber 81. Since the reaction chamber 81 is connected to the load ports 26 through the passage 69, annulus 68 and passages 49, the pressure level in the reaction chamber is essentially the same as the pressure level in the load ports 26 and hence the load chamber 12. The pressurized fluid in the reaction chamber 81 reacts against the effective area of the pressure reducing valve spool as previously described urging it leftwardly against the force of the resilient means 76. The leftward movement of the pressure reducing valve spool is resisted primarily by the lightweight first spring 77 so that the pressure reducing valve spool 61 functions to meter fluid from the passages 48 through the annulus 68, metering slot 72, annular chamber 71, and drain port 27 to establish the pressure in the reaction chamber 81 and load port 26 at a first predetermined level which is less than the system pressure at the inlet ports 24. Preferably, the first predetermined level is selected to only maintain the load chamber 12 and associated connecting lines full of fluid for consistent fill times of the load chamber 12 of the clutch. In the present embodiment the first predetermined pressure level is about 6.9–13.8kPa (1–2 psi).

It should be noted that the pressurized fluid in the reaction chamber 81 reacts against the end wall 51 and moves the sleeve member 46 against the resiliency of the dampening spring 84 to an initial position in abutment with the annular member 22.

Actuation of the pressure modulating and reducing valve 10 to a second operating condition, as shown in FIG. 2, at which the fluid pressure in the load ports 26 is at a second predetermined level which is greater than the first predetermined level and less than, or equal to, the fluid pressure at the inlet ports 24, is initiated by closing the switch 99 to energize the solenoid 92. This causes the plunger 94 to move leftward moving the valve spool 86 to a second position at which communication through the passages 44 is blocked thereby blocking the drain path from the actuating chamber 101. Concurrently with blocking the flow through the passages 44, a flow path is temporarily established from the reaction chamber 81 to the actuating chamber 101 through the passages 57 and annular groove 91 in the valve spool. This causes an immediate movement of the sleeve member 46 and end wall 51 leftwardly into engagement with the spring 83 and blocks flow of fluid from the annulus 68 to the drain ports 27 so that fluid from the inlet port 24 is immediately available to commence pressurizing the load chamber 12 of the clutch 13. Shortly after the end wall 51 engages the spring 83, fluid flow through the passages 57 is shut off so that fluid enters the actuating chamber 101 only through the orifice 102. As the pressure increases in the actuating chamber 101, the sleeve member 46 and end wall 51 continue to move leftwardly causing an increase in the fluid pressure in the reaction chamber 81 wherein the fluid pressure reacts against the pressure reducing valve spool 61 moving it leftward against the resilient means 76 to establish a pressure proportional to the movement of the sleeve member. It should be noted that the initial movement of the pressure reducing valve spool 61 compresses the first spring 77 such that the spacer 79 engages the shoulder 67. Thereafter leftward movement of the pressure reducing valve spool 61 is resisted by the higher rate spring 78. The rate of pressure rise in the load ports 26 is proportional to the rate of leftward movement of the sleeve member 46 which in turn is controlled by the flow through the orifice 102. Eventually, sleeve member 46 contacts the cylindrical member 28 thereby allowing the fluid pressure in the reaction chamber 81 and load port 26 to stabilize at the second predetermined level as determined by the second spring 78. The second predetermined level is selected to match the pressure required to achieve full engagement of a particular clutch.

Actuation of the pressure modulating and reducing valve 10 to a third condition at which the inlet ports 24 are blocked from the load ports 26 and the load ports 26 are in communication with the drain ports 27 is initiated by opening the switch 99 to deenergize the solenoid 92. This permits the spring 96 to move the valve spool 86 to the first position thereby opening the drain path from the actuating chamber 101 to the reservoir 14. As the spring 83 moves the sleeve member 46 rightwardly, the fluid pressure in the load ports 26, load chamber 12 and actuating chamber 81 starts to decay so that the pressure reducing valve spool 61 tends to follow the sleeve member 46 under the influence of the resilient means 78. The sleeve member 46 and pressure reducing valve spool 61 subsequently reach the first condition wherein the fluid pressure in the load ports 26 and reaction chamber 81 stabilizes at the first predetermined pressure level.

The basic operation of the pressure modulating and reducing valve 10 of the second embodiment shown on FIG. 3 is substantially the same as that described above. Thus the operation of the embodiment of FIG. 3 will deal primarily with the function of the outlet ports 107 and the drain ports 108 of the body 19 and the third passages 109 of the sleeve member 46. In this embodiment the pressure modulating and reducing valve 10 has priority over the downstream pressure modulating and reducing valve 10' to ensure that only one of the clutches 13 or 13' can be actuated at one time. More specifically, when the pressure modulating and reducing valves 10 and 10' are in the first operating condition, the sleeve member 46 and the pressure reducing valve spool 61 of both valves are essentially in the position shown. At such position a first predetermined pressure level is maintained in the load ports 26 and 26'. Further at the first operating condition, fluid from the inlet ports 24 in the body 19 of the first valve 10 is transmitted through the second passages 48, the outlet ports 107 and the conduit 111 to the inlet ports 24' of the valve 10'. Communication between the outlet ports 107 and the drain ports 108 is blocked by the sleeve member 46.

However, when the pressure modulating and reducing valve 10 is actuated to the second operating condition in the manner described above, the sleeve member 46 and pressure reducing valve spool 61 are moved leftwardly to establish a second predetermined pressure level in the actuating chamber 12 of the clutch 13 to actuate the clutch 13. With the sleeve member 46 and pressure reducing valve spool 61 in that position, fluid flow from the inlet ports 24 to the outlet ports 107 is blocked by the sleeve member 46 and the outlet ports 107 are in communication with the drain ports 108 through the third passages 109 in the sleeve member 46. Thus fluid flow from the first pressure modulating and reducing valve 10 to the inlet port 24' of the second pressure modulating and reducing valve 10' is blocked and the inlet port 24' of the second valve 10' are communicated with the drain ports 108 via the outlet ports 107 and the third passages 109. Thus fluid from the pump 11 is available to the second pressure modulating and reducing valve 10' for actuating the clutch 13' only when the first pressure modulating and reducing valve 10 is in its first condition of operation.

In view of the foregoing it is readily apparent that the structure of the present invention provides an improved pressure modulating and reducing valve which is self contained in a compact cartridge form. The compactness is made possible by slidably nesting the pressure reducing valve spool within the sleeve member of the load piston and utilizing the movable aspect of the sleeve member relative to the pressure reducing valve spool to provide a valving function for controlling fluid flow between the inlet ports, the load ports and the drain ports such that moving the sleeve member at a controlled rate of travel causes an increase in the fluid pressure in the load ports. The modulated rate of pressure rise in the load ports is proportional to the travel speed of the sleeve member and can be modified to fit a particular use by changing the size of the orifice and/or by changing the spring rate of the control spring. Moreover, the maximum pressure established in the load ports is a function of the travel distance of the sleeve member and spring rate of the control spring and can be modified by changing either one or both of those parameters. Additionally, it is readily apparent that the structure of the second embodiment provides an improved pressure modulating and reducing valve adapted for use in cascade or series flow relationship. This provides priority flow to the upstream pressure modulating and reducing valve so that only one clutch can be actuated at any given time.

Other aspects, objects and advantages of this invention can be obtained from a study of the drawings, the disclosure and the appended claims.

We claim:

1. A pressure modulating and reducing valve (10) for communicating pressurized fluid from a source (11) to a load chamber (12) at a modulated rate of pressure rise and at a reduced pressure, comprising:

a housing (18) including a body (19) having a bore (23) therein and an inlet port (24), a load port (26) and a drain port (27) axially spaced from one another and being in communication with the bore (23), and a retainer (21) connected to the body (18) at one end of the bore (23);

a sleeve member (46) slidably positioned in said bore (23) of said body (19) and having a bore (47) therein and first and second passages (48,49) communicating the bore (47) of the sleeve member (46) with the inlet port (24) and the load port (26) respectively;

an end wall (51) connected to the sleeve member (46) at one end of the bore (47) of the sleeve member (46);

a pressure reducing valve spool (61) slidably positioned in the bore (47) of the sleeve member (46) for relative movement therebetween;

resilient means (76) for resisting movement of the pressure reducing valve spool (61) toward the retainer (21);

a reaction chamber (81) between the pressure reducing valve spool (61) and the end wall (51);

means (82) for communicating the load port (26) with the reaction chamber (81); and means (103) for selectively moving the sleeve member (46) relative to the pressure reducing valve spool (61) and the body (19) at a modulated rate so that the fluid pressure in the reaction chamber (81) and the load port (26) increases and reacts against the pressure reducing valve spool (61) moving it against the resilient means (76) to establish a pressure proportional to the movement of the sleeve member.

2. The valve (10) of claim 1 wherein said housing (18) includes an end member (22) at the other end of said bore (23) in the body (19) and wherein said means (103) for selectively moving the sleeve member (46) includes an actuating chamber (101) in the body (19) between the end member (22) and the end wall (51) and means (104) for selectively pressurizing the actuating chamber (101).

3. The valve of claim 2 wherein said means (104) for selectively pressurizing the actuating chamber (101) includes an orifice (102) in the end wall (51) interconnecting the reaction chamber (81) and actuating chamber (101), a passage (44) in the end member (22) in communication with the actuating chamber (101), a drain passage (43), and a control valve (85) disposed between said passage (44) and said drain passage (43) and being movable between an open position at which fluid passes through the passage (44) to the drain passage (43) and a second position at which fluid flow through the passage (44) is blocked.

4. The valve (10) of claim 3 wherein said control valve (85) is solenoid actuated and is moved to the closed position in response to an electrical signal.

5. The valve (10) of claim 4 wherein said end member (22) has a bore (42) coaxial with the bore (23) in the body (19), and said passage (44) in said end member (22) connects the actuating chamber (101) with the bore (42) in the end member, said control valve (85) including a valve spool (86) slidably disposed in the bore (42) of the end member (22).

6. The valve (10) of claim 5 including means (106) for biasing the sleeve member (46) to an initial position against the end member (22).

7. The valve (10) of claim 6 wherein said pressure reducing valve spool (61) has an axially extending bore (62) therein, an annulus (68) in its outer periphery and in communication with the second passage (49) in the sleeve member (46), and a passage (69) communicating the annulus (68) with the bore (47), wherein said means (82) for communicating includes the annulus (68) and the passage (69) in the pressure reducing valve spool (61).

8. The valve (10) of claim 7 wherein the end wall (51) includes a projection (54) extending into the bore (62) of the pressure reducing valve spool (61) and having a bore (56) coaxial with the bore (62) in the pressure reducing valve spool and a passage (57) connecting the reaction chamber (81) with the bore (56) in the projection (54), said valve spool (86) of the control valve (85) blocking communication through the passage (57) in the projection (54) at the first position thereof and having an annular groove (91) communicating the passage (57) in the projection (54) with the actuating chamber (101) when the valve spool (86) is moved to the second position and the sleeve member (46) is in the initial position against the annular member (22).

9. The valve (10) of claim 6 wherein said means for biasing (106) includes a spring (83) positioned between the retainer (28) and the end wall (51).

10. The valve (10) of claim 3 wherein said orifice (102) and said resilient means (76) cooperate to control the travel speed of the sleeve member (46) and hence the rate of pressure rise in the load port (26).

11. The valve (10) of claim 3 wherein said source of pressurized fluid is a pump (11) connected to the inlet port (24), said load chamber (12) being a load chamber of a clutch (13) connected to the load port (26), and including a reservoir (14) connected to the drain port (27).

12. The valve (10) of claim 3 wherein the retainer (21) closes said one end of the bore (23) in the body (19) and has a bore (33) therein coaxial with the bore (23) in the body (19), said pressure reducing valve spool (61) having a reduced diameter portion (70) slidably positioned within the bore (33) of the retainer (21) and forming an annular chamber (71) in communication with the drain port (27).

13. The valve (10) of claim 3 wherein said pressure reducing valve spool has first and second counterbores (63,64) at one end thereof defining first and second shoulders (66,67), said resilient means (76) including a first spring (77) positioned in the first counterbore (63) and having one end in abutment with the first shoulder (66), a second spring (78) having one end in abutment with the retainer (21) and extending into the second counterbore (64), and a spacer (79) slidably disposed within the second counterbore (64) and positioned between the first and second springs (77,78).

14. The valve (10) of claim 1 wherein said sleeve member (46) is movable by said selectively moving means (103) to controllably establish a first operating condition of said valve (10) at which the fluid pressure in the load port (26) is at a first predetermined level which is less than the pressure at the inlet port (24), and a second operating condition at which the fluid pressure in the load port (26) is at a second predetermined level which is greater than the first predetermined level and less than the fluid pressure in the inlet port (24).

15. The valve (10) of claim 14 wherein said body (19) has an outlet port (107) axially spaced from the inlet port (24) of the body (19), said outlet port (107) being in communication with the inlet port (24) through the first passage (48) in the sleeve member (46) when the valve (10) is in the first operating condition and being blocked from the inlet port (24) by the sleeve member (46) when the valve (10) is in the second operating condition.

16. The valve (10) of claim 15 wherein said body (19) has a second drain port (108) axially spaced from the outlet port (107) and said sleeve member (46) has a third passage (109) in continuous communication with said second drain port (108), said outlet port (107) being blocked from communication with the third passage (109) and the second drain port (108) when the valve (10) is in the first operating condition and being in communication with the third passage (109) and the second drain port (108) when the valve (10) is in the second operating condition.

17. The valve (10) of claim 16 wherein said valve (10) is adapted for use as a first pressure modulating and reducing valve (10) in a hydraulic circuit (110) having a second pressure modulating and reducing valve (10') downstream of the first valve (10) wherein when the first valve (10) is in the first operating condition fluid flow from the outlet port (107) of the first valve (10) is directed to the inlet port (24') of the second valve (10') and when the first valve (10) is in the second operating condition, fluid flow from the first valve (10) to the inlet port (24') of the second valve (10') is blocked and the inlet port (24') of the second valve (10') is in communication with the second drain port (108) of the first valve (10) via the outlet port (107) in the body (19) and the third passage (109) in the sleeve member (46).

* * * * *